United States Patent [19]

Trimmer et al.

[11] Patent Number: 5,013,437
[45] Date of Patent: May 7, 1991

[54] HOLLOW FIBER MEMBRANE FLUID SEPARATION DEVICE ADAPTED FOR BORESIDE FEED WHICH CONTAINS MULTIPLE CONCENTRIC STAGES

[75] Inventors: Johnny L. Trimmer, Antioch; Terrence L. Caskey, Concord; Janine L. Jorgensen, Clayton, all of Calif.

[73] Assignee: The Dow Chemical Company, Midland, Mich.

[21] Appl. No.: 573,090

[22] Filed: Aug. 24, 1990

Related U.S. Application Data

[63] Continuation-in-part of Ser. No. 429,928, Oct. 30, 1989, Pat. No. 4,961,760, which is a continuation-in-part of Ser. No. 309,756, Feb. 9, 1989, Pat. No. 4,929,259.

[51] Int. Cl.$^5$ ............... B01D 63/04; B01D 63/06
[52] U.S. Cl. .................. 210/321.78; 55/16; 55/68; 55/158; 210/321.79; 210/321.8; 210/336; 210/500.23
[58] Field of Search .............. 210/500.23, 321.9, 336, 210/650, 321.88, 450, 321.1, 321.78, 321.89, 321.81, 321.85, 321.79, 323.2; 55/16, 158; 252/8.554; 256/68

[56] References Cited

U.S. PATENT DOCUMENTS

| | | | |
|---|---|---|---|
| 3,339,341 | 9/1967 | Maxwell et al. | 55/16 |
| 3,832,830 | 9/1974 | Gerow | 55/158 |
| 4,031,012 | 6/1977 | Gics | 55/158 |
| 4,061,574 | 12/1977 | Clark | 210/321 |
| 4,179,380 | 12/1979 | Amicel et al. | 210/321 |
| 4,235,983 | 11/1980 | Steigelmann et al. | 526/68 |
| 4,264,338 | 4/1981 | Null | 55/16 |
| 4,268,279 | 5/1981 | Shindo et al. | 55/16 |
| 4,269,712 | 5/1981 | Hornby et al. | 210/450 |
| 4,293,419 | 10/1981 | Sekino et al. | 210/321.1 |
| 4,367,139 | 1/1983 | Graham | 210/321.3 |
| 4,451,369 | 5/1984 | Sekino et al. | 210/336 |
| 4,508,548 | 4/1985 | Manatt | 55/158 |
| 4,565,630 | 6/1986 | Runkle | 210/323.2 |
| 4,578,190 | 3/1986 | Fowler | 210/323.2 |
| 4,647,380 | 3/1987 | Dasgupta | 210/321.78 |
| 4,676,808 | 6/1987 | Coplan | 55/158 |
| 4,707,267 | 11/1987 | Johnson | 210/650 |
| 4,718,921 | 1/1988 | Makino et al. | 55/16 |
| 4,734,106 | 3/1988 | Gollan | 55/16 |
| 4,752,305 | 6/1988 | Johnson | 55/16 |
| 4,781,834 | 11/1988 | Sekino et al. | 210/321.88 |
| 4,865,736 | 9/1989 | Coplan | 55/158 |
| 4,871,379 | 10/1989 | Edwards | 55/158 |
| 4,894,068 | 1/1990 | Rice | 55/16 |
| 4,929,259 | 5/1990 | Caskey et al. | 55/158 |
| 4,961,760 | 10/1990 | Caskey et al. | 210/500.23 |

FOREIGN PATENT DOCUMENTS 5331828 9/1978 Japan .
6119273 11/1984 Japan .
2198430 6/1988 United Kingdom .

OTHER PUBLICATIONS

Antonson et al., "Analysis of Gas Separation by Permeation in Hollow Fibers", *Ind. Eng. Chem., Process Des: Dev.*, vol. 16, No. 4, 1977, pp. 463–469.

*Primary Examiner*—Robert A. Dawson
*Assistant Examiner*—Ana M. Fortuna
*Attorney, Agent, or Firm*—Janet Pauline Clark

[57] ABSTRACT

The invention is a hollow fiber membrane fluid separation device specially adapted for boreside feed which contains multiple concentric stages.

26 Claims, 3 Drawing Sheets

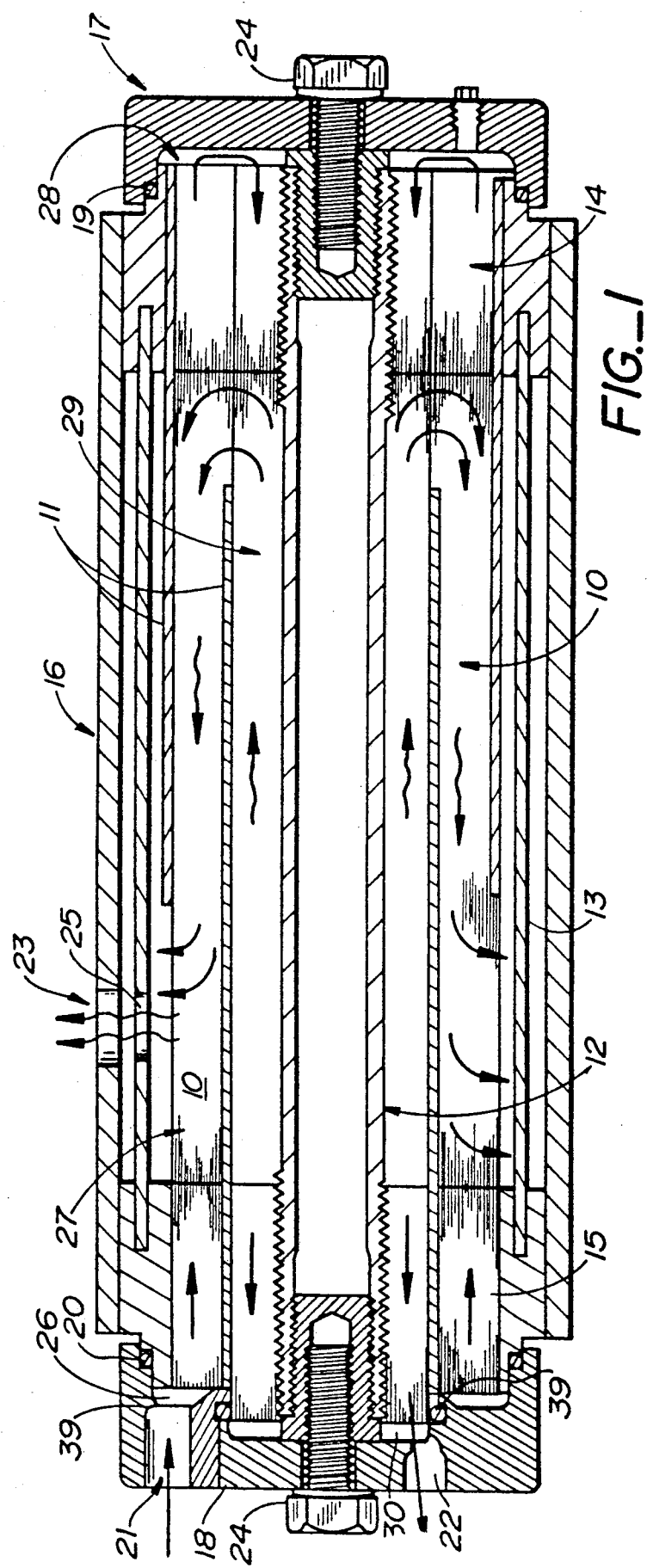
FIG._1

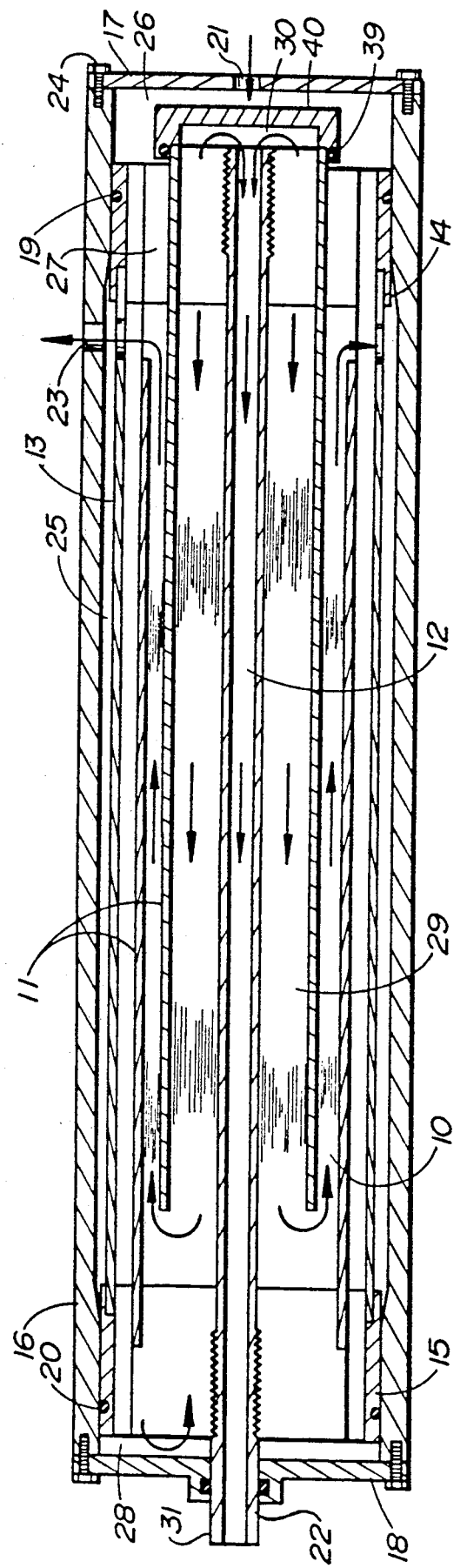
FIG._2

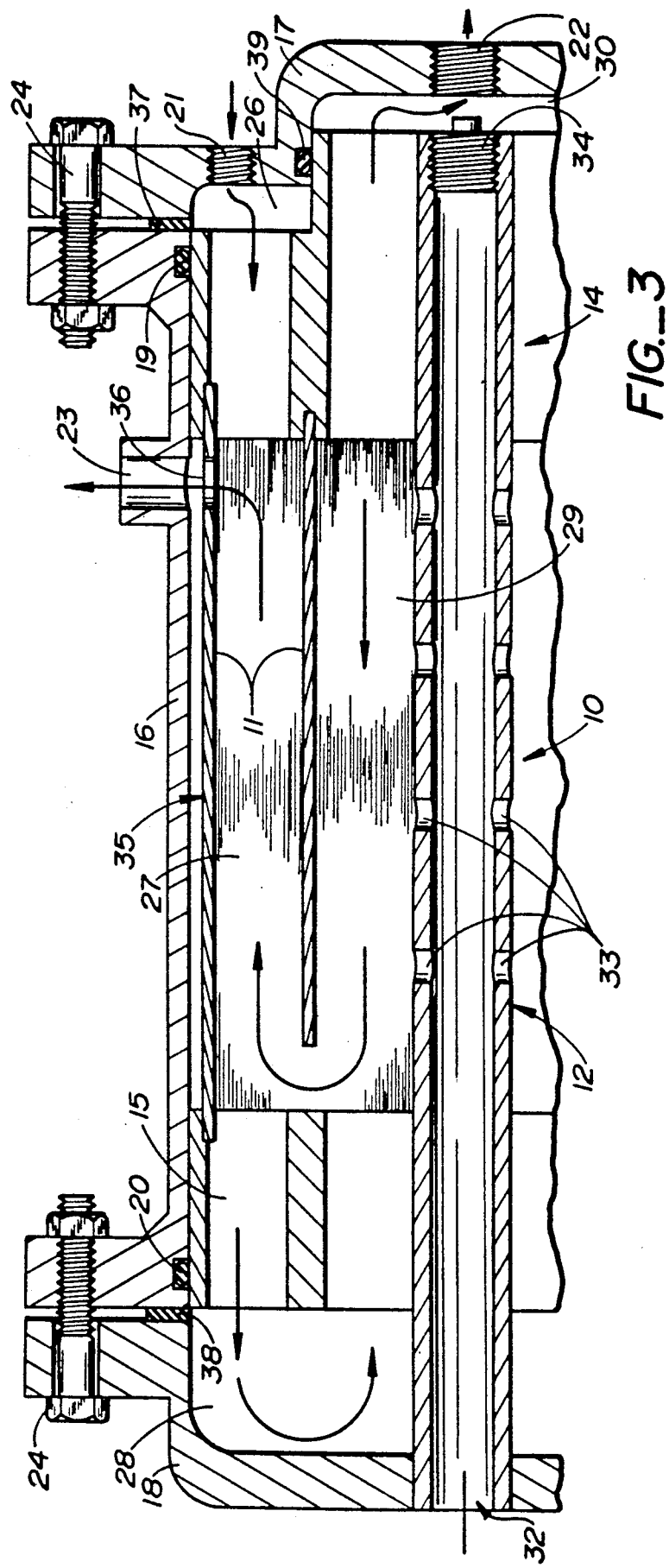

HOLLOW FIBER MEMBRANE FLUID SEPARATION DEVICE ADAPTED FOR BORESIDE FEED WHICH CONTAINS MULTIPLE CONCENTRIC STAGES

CROSS REFERENCE TO RELATED CO-PENDING APPLICATION

This application is a continuation-in-part of U.S. patent application Ser. No. 07/429,928, filed Oct. 30, 1989, now U.S. Pat. No. 4,961,760 which in turn is a continuation-in-part of U.S. patent application Ser. No. 07/309,756, filed Feb. 9, 1989, now U.S. Pat. No. 4,929,259.

BACKGROUND OF INVENTION

This invention relates to a hollow fiber membrane fluid separation device which is adapted for boreside feed of a fluid mixture and which contains multiple concentric stages.

Hollow fiber membrane devices commonly contain two or three regions, wherein such regions are sealingly engaged or otherwise maintained separate and distinct so that fluid cannot communicate from one region to the other, except by passing the fluid through the bores of the hollow fibers or by permeating the fluid across the walls of the hollow fibers. Generally, a hollow fiber membrane device comprises a bundle of hollow fibers arranged in a fashion such that each end of the hollow fibers are embedded in a resin matrix commonly referred to as a tubesheet or header. Such hollow fibers communicate through the tubesheets and are open on the exterior face of each tubesheet. The exterior face of the tubesheet as used herein means the face of the tubesheet which is opposite the bundle.

Generally, the regions of a hollow fiber membrane separation device are maintained separate and distinct by the tubesheets and seals about the tubesheets. In a shellside feed process, the region about the outside of the hollow fiber bundle between the tubesheets is pressurized. The fluid mixture to be separated is introduced into the device in the region between the tubesheets and the outside of the hollow fibers, that is, the shellside, and the fluid which permeates through the hollow fiber membranes into the bores of the hollow fibers is removed at one or both ends of the hollow fibers in the region(s) adjacent to the exterior face of one or both tubesheets. The non-permeating fluid is removed from a region in the area between the tubesheets and the outside of the hollow fibers. Most commercial industrial fluid separation membrane devices and processes operate in this fashion.

In a boreside feed process, the mixture of fluids to be separated is introduced into one end of the hollow fiber membrane device adjacent to the exterior face of the first tubesheet such that the fluid mixture flows down the bores of the hollow fibers through the first tubesheet and into the portion of the hollow fibers contained in the region between the tubesheets. In the region between the tubesheets, the fluid which selectively permeates through the hollow fiber membranes is removed from the shellside of the device on the outside of the hollow fibers. The fluid which does not permeate through the hollow fiber membranes exits into a region adjacent to the exterior face of the second tubesheet and is removed from that region. In such a boreside feed operation, pressure is exerted on the exterior faces of the tubesheets which are opposite the fiber bundle. The bores of the hollow fibers are also pressurized in such an operation. As the tubesheets are usually comprised of a resinous material, significant bending, compressive, and shear stresses are exerted on the tubesheets by such a boreside feed operation. Such stresses exerted on the tubesheets create a problem with respect to supporting the tubesheets and preventing the tubesheets from collapsing in on the hollow fiber bundle.

A second problem associated with boreside feed is obtaining adequate flow distribution of the permeate on the shellside of the hollow fiber membrane device so that efficient separation can be achieved. One of the driving forces for transport through the membrane is the concentration gradient across the membrane. As the fluid mixture to be separated flows down the bores of the hollow fibers and the selectively permeable fluid permeates through the hollow fibers, the concentration of the selectively permeable fluid inside the hollow fibers is reduced and the concentration of the selectively permeable fluid on the shellside (outside) of the hollow fibers increases. This results in a decrease of the concentration driving force across the membrane, which lowers separation performance.

A third problem associated with boreside feed is that if the flow on the shellside of the hollow fiber membranes is not properly controlled, the shellside of the hollow fiber membrane device will contain localized areas of high concentration of the permeate fluid, which further reduces separation performance.

Yet another problem encountered, particularly in the separation of gases, is the inability to obtain a non-permeate product stream of high purity with a single membrane device, due to inefficiencies associated with conventional membrane devices which are single stage. Series operation using multiple membrane devices has therefore been necessary to achieve a high purity non-permeate product stream. Such use of multiple membrane devices to achieve a high purity non-permeate product stream is costly due to the use of multiple cases and the additional piping required for multiple membrane devices. The space occupied by such multiple membrane devices is also a disadvantage.

What is needed is a hollow fiber membrane fluid separation device which is adapted for boreside feed and minimizes the stresses on the tubesheets. What is further needed is such a membrane device in which the flow of the permeate on the shellside of the device is controlled to maximize the concentration gradients along the hollow fibers and to prevent localized areas of high permeate concentration, thus enhancing the flow of permeate on the shellside of the device and rendering the device more efficient. What is further needed is such a membrane device which is capable of producing a high purity non-permeate product stream which is less costly and occupies less space than conventional systems utilizing multiple membrane devices.

SUMMARY OF INVENTION

The invention is a concentric multistage hollow fiber membrane fluid separation device adapted for boreside feed comprising:

A. a bundle comprising a plurality of hollow fiber membranes adapted for the separation of one or more fluids from one or more other fluids in a feed fluid mixture, wherein the bundle is partitioned into multiple stages comprising concentric annular regions comprising a feed stage and at least one non-permeate stage, wherein each stage possesses a feed end and a non-permeate end, wherein the feed end of each non-permeate stage is located at the opposite end of the bundle from the feed end of the immediately preceding stage and the non-permeate end of each non-permeate stage is located at the opposite end of the bundle from the non-permeate end of the immediately preceding stage;

B. a first tubesheet comprising a thermoset or thermoplastic polymeric material located adjacent to the first end of the bundle, wherein the first tubesheet is arranged such that the hollow fiber membranes are embedded in the first tubesheet and communicate through the first tubesheet and are open on the exterior face of the first tubesheet;

C. a second tubesheet comprising a thermoset or thermoplastic polymeric material located adjacent to the second end of the bundle opposite the first end of the bundle, wherein the second tubesheet is arranged such that the hollow fiber membranes are embedded in the second tubesheet and communicate through the second tubesheet and are open on the exterior face of the second tubesheet;

D. a first end capping means arranged and adapted for sealing at the vicinity of the first end of the bundle and/or the first tubesheet;

E. a first attachment means arranged for attaching the first end capping means at the vicinity of the first end of the bundle and/or the first tubesheet;

F. a first means for forming a seal between the first end capping means and the first end of the bundle and/or the first tubesheet;

G. a second end capping means arranged and adapted for sealing at the vicinity of the second end of the bundle and/or the second tubesheet;

H. a second attachment means arranged for attaching the second end capping means at the vicinity of the second end of the bundle and/or the second tubesheet;

I. a second means for forming a seal between the second end capping means and the second end of the bundle and/or the second tubesheet;

J. a feed inlet means adapted for introducing the feed fluid mixture to be separated into the device;

K. a feed inlet region, wherein the feed inlet region is sealed such that fluid enters the feed inlet region through the feed inlet means or leaves the feed inlet region through the hollow fiber membranes disposed within the feed stage, wherein the feed inlet region is arranged to introduce the feed fluid mixture into the bores of the hollow fiber membranes disposed within the feed stage at the feed end of said feed stage;

L. at least one non-permeate mixing region encompassing the non-permeate end of a stage and the feed end of the immediately successive stage, wherein the non-permeate from said stage enters each non-permeate mixing region from the bores of the hollow fiber membranes disposed within said stage at the non-permeate end of said stage, and each non-permeate mixing region cooperates with the immediately successive non-permeate stage to introduce fluid into the bores of the hollow fiber membranes disposed within said immediately successive non-permeate stage at the feed end of said immediately successive stage;

M. a non-permeate outlet means adapted for removing fluid which does not permeate through the hollow fiber membranes from the device;

N. a non-permeate outlet region, wherein the non-permeate outlet region is sealed such that fluid which does not permeate the hollow fiber membranes enters the non-permeate outlet region through the hollow fiber membranes or leaves the non-permeate outlet region through the non-permeate outlet means, wherein the non-permeate outlet region is arranged to remove the fluid which does not permeate the hollow fiber membranes from the device through the non-permeate outlet means; and O. means for forming a seal between the non-permeate end of each non-permeate stage and the feed end of each immediately preceding stage;

P. optionally, at least one means for channeling flow per stage of fluid which permeates through the hollow fiber membranes to the region between the two tubesheets which is outside of the hollow fiber membranes, wherein each means for channeling flow is arranged to channel flow of fluid which permeates through the hollow fiber membranes from each stage in a direction countercurrent to the flow of fluid down the bores of the hollow fiber membranes disposed within said stage, which is parallel to the longitudinal axis of the bundle, wherein each means for channeling flow has one end located near, embedded in, or attached to one of the tubesheets and the second end located at a distance from the opposite tubesheet, wherein the distance between the second end of the means for channeling flow and the opposite tubesheet is sufficient to allow the fluid which permeates through the hollow fiber membranes and flows along the means for channeling flow to flow therethrough;

Q. optionally, a core about which is arranged the bundle, further arranged such that the core extends through and is bonded to the first tubesheet and the second tubesheet;

R. optionally, a casing means surrounding the bundle, the first tubesheet, the second tubesheet, and the core; and S optionally, a permeate outlet means for removing fluid which permeates through the hollow fiber membranes from the region between the two tubesheets which is outside of the hollow fiber membranes; and T. optionally, a means for introducing a sweep fluid into the region between the two tubesheets which is outside of the hollow fiber membranes.

The hollow fiber membrane separation devices of this invention provide for improved support of the resin tubesheets, thus reducing the bending, compressive, and shear stresses on the tubesheets. The devices of this invention also demonstrate improved permeate flow and more efficient recovery of permeate and non-permeate fluids, enabling a high purity non-permeate stream to be obtained within a single membrane device.

BRIEF DESCRIPTION OF THE DRAWINGS

FIG. 1 illustrates a hollow fiber membrane device of this invention which comprises two concentric stages.

FIG. 2 illustrates an alternate embodiment of the device of this invention wherein the core is hollow and is adapted to function as the non-permeate outlet means.

FIG. 3 illustrates a device of this invention which is adapted for use of a sweep fluid.

DETAILED DESCRIPTION OF THE INVENTION

This invention relates to devices for separating one or more fluids from one or more other fluids in a fluid mixture, in which the separation is performed by selectively transporting one or more fluids across a membrane. In this invention, the membranes are in hollow fiber form and the device is adapted for feeding the fluid mixture to be separated down the bores or lumens of the hollow fiber membranes. The bore or lumen as used herein refers to the portion of the fiber which is hollow in the center of such fiber.

The hollow fiber membrane devices of this invention can be used to separate one or more fluids from one or more other fluids in a fluid mixture, wherein the fluids possess different transport rates through or across the membranes. The fluids may be in gas, vapor, or liquid state.

In one preferred embodiment, the hollow fiber membrane devices of this invention are useful in separating one or more gases from one or more other gases in a feed gas mixture. The mixture of gases to be separated preferably comprises at least one of the gases selected from the group consisting of hydrogen, helium, oxygen, nitrogen, carbon monoxide, carbon dioxide, hydrogen sulfide, ammonia, methane, other light hydrocarbons, and the like. Light hydrocarbons as used herein means saturated and unsaturated $C_{1-4}$ hydrocarbons. Examples of such gases being separated are hydrogen and/or helium from light hydrocarbons, oxygen from nitrogen, nitrogen from methane, carbon monoxide and/or carbon dioxide from light hydrocarbons, and the like.

In another preferred embodiment, the fluids to be separated are liquids. In one preferred embodiment wherein the fluids to be separated are liquids, the material is transported through or across the membrane as a gas or vapor. The material permeating through or across the membrane as a gas or vapor may be removed from the device as a gas or vapor, or condensed and removed from the device as a liquid. This separation may be referred to as membrane stripping, membrane distillation, or pervaporation. In membrane stripping, a microporous membrane is used and the material permeating through or across the membrane is removed from the device as a gas or vapor. In membrane distillation, a microporous membrane is used and the material permeating through or across the membrane is condensed and removed from the device as a liquid. In pervaporation, a non-microporous membrane, that is, a membrane possessing a dense discriminating layer or region, is used and the material permeating through or across the membrane may be removed as a gas or vapor or condensed and removed from the device as a liquid. In these embodiments, volatile compounds, that is, those with relatively higher vapor pressures under the separation conditions, are separated from compounds with relatively lower vapor pressures. Examples of volatile compounds which may be removed from liquid mixtures include $C_{1-10}$ aliphatic and aromatic halogenated hydrocarbons such as dichloromethane (methylene chloride), dibromomethane (methylene bromide), trichloromethane (chloroform), tribromomethane (bromoform), carbon tetrachloride, 1,1-dichloroethane, 1,2-dichloroethane, 1,1,1-trichloroethane, 1,1,2-tri-chloroethane, trichloroethylene, tetrachloroethylene (perchloroethylene), 1,2-dichloropropane, chlorobenzene, dichlorobenzene, trichlorobenzene, and hexachlorobenzene; $C_{1-10}$ aliphatic and aromatic hydrocarbons such as methane, ethane, propane, butane, hexane, heptane, octane, ethylene, propylene, butylene, benzene, toluene, and xylene; $C_{1-10}$ aliphatic and aromatic alcohols such as methanol, ethanol, propanol, butanol, pentanol, hexanol, and phenol; $C_{1-8}$ ketones such as acetone, methylethylketone, methyl-isobutylketone, pentanone, and hexanone; $C_{1-8}$ ethers such as bis(2-chloroethyl)ether; $C_{1-8}$ amines such as methylamine, dimethylamine, trimethylamine, ethylamine, diethylamine, triethylamine, ethylenediamine, and aniline; and the like. Less volatile liquids from which the volatile compounds may be removed include water and mixtures of water and organics. In another preferred embodiment, gases entrained or dissolved in a liquid may be removed from such liquids. Examples of such entrained or dissolved gases include oxygen, carbon monoxide, carbon dioxide, sulfur dioxide, hydrogen sulfide, ammonia, and the like.

In some embodiments, a sweep fluid may be employed. In the embodiment wherein a sweep fluid is used, the sweep fluid may be any fluid which aids in the removal of the permeate fluid from the shellside of the membrane device. The sweep fluid may be a liquid, vapor, or gas. In gas separation or membrane stripping separation, the sweep fluid is preferably a gas or vapor. Preferred sweep gases include air, nitrogen, and the like.

The hollow fiber membranes are arranged in a bundle which comprises a plurality of the hollow fiber membranes. The bundle is partitioned into multiple stages comprising concentric annular regions comprising a feed stage and at least one non-permeate stage. Such a bundle may take various shapes and possess various fiber wrapping patterns Bundles of hollow fiber membranes useful in this invention may comprise various shapes and fiber arrangements, including those disclosed in U.S. Pat. Nos. 3,422,008 and 3,228,876; the relevant portions of each patent incorporated herein by reference for all legal purposes which may be served thereby. Preferably the bundle is arranged in an organized, that is, substantially non-random, fashion. In one preferred embodiment, the hollow fiber membrane bundle is arranged in a cylindrical fashion with the ends of the hollow fibers located at each end of the cylindrical bundle. Such a bundle is preferably an elongated bundle with the length being greater than the diameter. Preferably, the hollow fibers in the bundle are arranged in either a parallel wrap fashion or in a bias wrap fashion. In parallel wrapping, the hollow fibers lie substantially parallel to one another with each end of the hollow fibers located at each end of the bundle. In bias wrapping, the hollow fibers are wrapped in a crisscross pattern at a set angle, thus holding the hollow fibers in place in a bundle. Permeable cloth wraps such as DYNEL ® polyester cloth may be used to help hold the bundles together.

Each stage in the bundle possesses a feed end and a non-permeate end. The feed end of each non-permeate stage is located at the opposite end of the bundle from the feed end of the immediately preceding stage. The non-permeate end of each non-permeate stage is located at the opposite end of the bundle from the non-permeate end of the immediately preceding stage. Such an arrangement in conjunction with the optional flow channeling means promotes countercurrent flow of fluid within the hollow fiber membrane device.

The surface area provided by the hollow fiber membranes within each stage may vary, depending upon the total number of stages and the separation performance desired. Preferably, the surface area provided within a stage is greater than the surface area provided within the immediately successive stage. The optimum ratio of surface areas is generally that which provides substantially equal pressure drops within each stage. In the embodiment utilizing two stages, that is, a feed stage and one non-permeate stage, the ratio of surface area in the feed stage to surface area in the non-permeate stage is preferably in the range of about 1:1 to about 5:1, more preferably in the range of about 1:1 to about 2.5:1, even more preferably in the range of about 1.5:1 to about 2.25:1.

The hollow fiber membranes are generally formed from a polymeric material which is capable of separating one or more fluids from one or more other fluids in a fluid mixture. The polymeric materials which may be used to prepare the hollow fiber membranes preferably include olefinic polymers, such as poly-4-methylpentene, polyethylene, and polypropylene; polytetrafluoroethylene; cellulosic esters, cellulose ethers, and regenerated cellulose; polyamides; polyetherketones and polyetheretherketones; polyestercarbonates and polycarbonates, including ring substituted versions of bisphenol based polyestercarbonates and polycarbonates; polystyrenes; polysulfones; polyimides; polyethersulfones; and the like. The hollow fiber membranes may be homogeneous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one or more fluids from one or more other fluids based on relative volatilities of the fluids.

Hollow fiber membranes with dense regions are preferred for gas separations. Asymmetric hollow fiber membranes may have the discriminating region either on the outside of the hollow fiber, at the inside (lumen surface) of the hollow fiber, or located somewhere internal to both outside and inside hollow fiber membrane surfaces. In the embodiment wherein the discriminating region of the hollow fiber membrane is internal to both hollow fiber membrane surfaces, the inside (lumen) surface and the outside surface of the hollow fiber membrane are porous, yet the membrane demonstrates the ability to separate gases. In the embodiment wherein gases are separated, the preferred polymeric materials for membranes include polyestercarbonates, polysulfones, polyethersulfones, polyimides, and polycarbonates. More preferred polymeric materials for gas separation membranes include polycarbonates and polyestercarbonates. Preferred polycarbonate and polyestercarbonate membranes for gas separation include those described in U.S. Pat. Nos. 4,874,401, 4,851,014, 4,840,646, and 4,818,254; the relevant portions of each patent incorporated herein by reference for all legal purposes which may be served thereby. In one preferred embodiment, such membranes are prepared by the process described in U.S. Pat. No. 4,772,392, the relevant portions incorporated herein by reference for all legal purposes which may be served thereby.

Microporous membranes are preferred for liquid separations such as membrane stripping and membrane distillation. Such microporous membranes may be symmetric (isotropic) or asymmetric (anisotropic). In the embodiment wherein liquids are separated, preferred polymeric materials for membranes include polyolefins or fluorinated polyolefins, such as polyethylene, polypropylene, poly-4-methylpentene, and fluorinated polyethylene polytetrafluoroethylene, and copolymers and blends thereof; polystyrenes; and polyetherketones and polyetheretherketones. The methods for preparing such hollow fiber membranes are well known in the art. See, for example, U.S. Pat. Nos. 4,927,535, 4,904,426, and 4,115,492; the relevant portions of each patent incorporated herein by reference for all legal purposes which may be served thereby.

About each end of the bundle is a tubesheet. The tubesheet functions to hold the hollow fiber membranes in place and to separate the membrane device into different fluid regions. Such regions include the feed inlet region, wherein the fluid mixture to be separated is introduced into the bores of the hollow fiber membranes disposed within the feed stage at the feed end of said feed stage by contacting the feed fluid mixture at the exterior face of the tubesheet with the feed end of the hollow fiber membranes disposed within said feed stage. Another region is the region between the two tubesheets, wherein a portion of the fluid fed down the bores of the hollow fiber membranes permeates across the hollow fiber membranes onto the shellside (outside) of the hollow fiber membranes. Another region includes at least one non-permeate mixing region encompassing the non-permeate end of a stage and the feed end of the immediately successive stage, wherein the non-permeate from said stage enters each non-permeate mixing region from the bores of the hollow fiber membranes disposed within said stage at the non-permeate end of said stage, and each non-permeate mixing region cooperates with the immediately successive non-permeate stage to introduce fluid into the bores of the hollow fiber membranes disposed within said immediately successive non-permeate stage at the feed end of said immediately successive stage. Another region is the non-permeate outlet region, wherein the fluid flowing down the bores of the hollow fiber membranes which does not permeate across the membranes is removed from the device through the non-permeate outlet means.

The tubesheets may be comprised of a thermoset or thermoplastic resinous material. Such resinous material should be capable of forming a fluid tight seal around the hollow fiber membranes. In some embodiments, it is preferable that such resinous material be capable of bonding to the core and/or casing means as well as the hollow fiber membranes. The hollow fiber membranes in the bundle communicate through each tubesheet, and the exterior face of each tubesheet opposite the bundle is opened such that the bores of the hollow fiber membranes are opened to the region adjacent to each tubesheet face, thereby allowing communication of fluid from such regions into and out of said hollow fiber membranes. The majority of each tubesheet comprises a composite of the hollow fiber membranes embedded in the resinous material The tubesheets may be any shape which performs the functions hereinbefore described. Preferably, the tubesheets are substantially circular with sufficient cross-sectional area and thickness to provide support for the hollow fiber membranes and to withstand the pressures exerted on the tubesheets during operation. The portion of each tubesheet outside of the bundle may be built up for various purposes depending upon the design of the membrane device. These portions of the tubesheets may comprise solely resin or resin impregnated cloth which is wrapped around the outer portion of each tubesheet or the like.

Examples of such materials useful as resinous materials for tubesheets include artificial and natural rubbers, phenolaldehydes, acrylic resins, polysiloxanes, polyurethanes, fluorocarbons, and epoxy resins.

In the embodiment wherein the device is used for gas separations, the tubesheets are preferably prepared from epoxy resins. Any epoxy resin which adheres to the hollow fiber membranes and provides stability to a hollow fiber membrane device once cured can be used in this invention. Polyepoxide resins which are desirable for the resin formulations useful in this invention include glycidyl polyethers of polyhydric phenols.

Illustrative of the polyhydric phenols are mononuclear phenols and polynuclear phenols, and included within the latter are the phenol-aldehyde condensation resins commonly known as novolac resins. Typical mononuclear phenols include resorcinol, catechol, hydroquinone, phloroglucinol and the like. Examples of polynuclear phenols include 2,2 bis(4-hydroxyphenyl)propane(bisphenol A), 4,4'-dihydroxybenzophenone, 1,1-bis(4-hydroxyphenyl)ethane, bis(2-hydroxynaphthyl)methane, 2,2-bis-4-hydroxyphenyl) butane, 4,4'-dihydroxyphenyl phenyl sulfone, and the like.

The preparation of such epoxy resins is well known and is described in a number of patents such as U.S. Pat. No. 2,935,488 and in textbooks such as Lee and Neville, *Handbook of Epoxy Resins*, McGraw-Hill Book Co., 1967, the relevant portions of each reference incorporated herein by reference for all legal purposes which may be served thereby.

Preferred epoxy resins are those resins derived from bisphenol A, e.g., diglycidyl ethers of bisphenol A. Such preferred resins generally correspond to the formula:

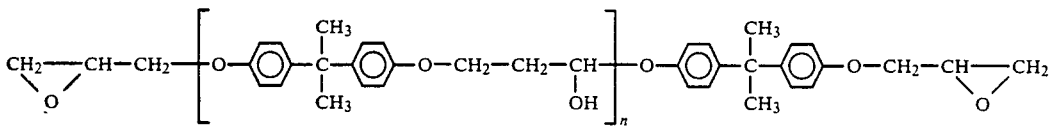

wherein n is a positive real number of between about zero and about 6, more preferably between about zero and about 4, more preferably between about zero and about 1.5.

In the discussion hereinafter, all parts with respect to the resin formulations will be based on 100 parts by weight of the epoxy resin (parts per hundred parts of resin, phr).

Epoxy resins preferred for use in this invention include D.E.R. ® epoxy resins, available from The Dow Chemical Company.

The epoxy resin is cured with a curing agent known to those skilled in the art. Typical curing agents include aliphatic as well as aromatic polyfunctional amines, both as purified compounds or as mixtures or blends with other compounds including those prepared as proprietary formulations by a number of different suppliers, such as Pacific Anchor Chemical Corporation.

Typical aromatic amines include m-phenylenediamine, methylenedianiline, mixtures (including adducts) of m-phenylenediamine and methylenedianiline, diaminodiphenylsulfone, 4-chlorophenylenediamine, and the like.

Typical aliphatic amines include aminoethylethanolamine, polymethylenediamines, polyetherdiamines, diaminocyclohexane, and the like.

Other classes of compounds useful as epoxy curing agents include acid anhydride compounds, such as nadic methylanhydride, methyltetrahydrophthalicanhydride, succinic anhydride, and the like. Generally, acid anhydride curing agents require use of a catalyst to promote curing at temperatures lower than about 100° C. Such catalysts are generally used in catalytic amounts, that is, amounts sufficient to enhance the curing of the epoxy resin with the curing agent. Preferably, the catalyst is present in an amount of between about 0.5 and about 10 parts of catalyst per hundred of resin, more preferably between about 0.5 and about 4 parts of catalyst per hundred parts of resin, and most preferably between about 1 and about 2 parts of catalyst per hundred parts of resin. Preferred catalysts include tertiary amines, for example, benzyldimethylamine, N,N,N',N'-tetramethylbutanediamine, dimethylaminopropylamine, N-methylmorpholine, N-triethylenediamine, and the like. Generally, where the curing agent is amine based, a catalyst is not necessary.

An additional optional component of curing agents for epoxy resins is a component which functions as a plasticizer for the cured resin, and which lowers the viscosity of the resin prior to the gellation of the resin. Such components as dioctylphthlate, dibutylphthlate, acetyltributylcitrate, or low molecular weight polyglycols, such as PEG 2000 manufactured by The Dow Chemical Company, are useful for this purpose.

The curing of epoxy resins is described in a number of textbooks, such as Lee and Neville, *Handbook of Epoxy Resins*, McGraw-Hill Book Co., 1967, the relevant portions incorporated herein by reference for all legal purposes which may be served thereby.

In the embodiment wherein the device of the invention is used for membrane stripping, membrane distillation, or pervaporation, the tubesheets preferably comprise the epoxy resins hereinbefore described or polyurethanes.

End capping means, with attachment means and means for forming a seal associated therewith, are arranged and adapted for sealing at the vicinity of each end of the bundle and/or each tubesheet to form regions adjacent to the exterior faces of the tubesheets which are opened to the hollow fiber membranes. Sealing at the vicinity of each end of the bundle as used herein includes an arrangement wherein each end capping means is attached and/or sealed to an optional casing means. The end capping means are attached at the vicinity of each end of the bundle and/or each tubesheet by an attachment means such that a seal is formed to prevent fluid communicating between separate and distinct fluid regions, including the feed inlet region, the region between the two tubesheets which is outside of the hollow fiber membranes, each non-permeate mixing region, and the non-permeate outlet region, except by passing through the bores of the hollow fiber membranes or by permeating through the hollow fiber membranes.

In a preferred embodiment, the end capping means is an end plate which is attached by an attachment means at the vicinity of each end of the bundle and/or each tubesheet. Such end plate may be attached by providing a means of affixing, such as bolting the end plate directly onto the tubesheet, optional casing means, or optional core. The optional casing means may have arranged about it or bonded to it an attachment means adapted for attaching the end capping means to the end of the casing means. Each end of the bundle may have arranged around its outside a flange to which the end capping means may be fastened. In one embodiment, the flange may be formed by building up the tubesheet. In another embodiment, a separate flange may be bonded about the tubesheet, the optional casing means, or both the tubesheet and the optional casing means. In another embodiment, a slip flange may be placed about the bundle or optional casing means. In such an embodiment, the tubesheet is built up such that the slip flange is held onto the membrane device. The end capping means is affixed to the flange which is held on the device by the built up tubesheet.

Means for forming a seal between each end capping means and each end of the bundle and/or each tubesheet are provided. The seal is formed by any means capable of providing a fluid tight seal between each end capping means and each end of the bundle and/or each tubesheet. Such means for forming a seal include non-permanent sealing means such as gaskets and O-rings and permanent sealing means such as bonding with an adhesive material. In one embodiment, the tubesheets may be bonded directly to the end capping and/or optional casing means with an adhesive material which bonds to both the tubesheet and the end capping and/or optional casing means. In a preferred embodiment, a groove is machined in each of the tubesheets about the outside circumference of said tubesheets, and an O-ring or gasket is then fit into said groove and sealed against the inside of the end capping and/or optional casing means so as to form an appropriate seal. In another preferred embodiment, the end capping and/or optional casing means contains a lip or taper, against which a gasket or O-ring is optionally placed, and against which the outer circumference of the tubesheet face adjacent to the gasket seals under the influence of the hydrostatic pressure applied during operation of the device.

The membrane devices of this invention further comprise a feed inlet means. Generally, this is a port, nozzle, fitting, or other opening which allows introduction of the fluid mixture to be separated into the device. In a boreside feed device, the feed inlet means is located such that the feed fluid may be introduced into the bores of the hollow fiber membranes disposed within the feed stage by contacting the feed fluid mixture at the exterior face of the tubesheet with the feed end of hollow fiber membranes disposed within the feed stage. The feed inlet means may be located in the appropriate end capping means.

Preferably, the device is designed such that there is a region or cavity, that is, the feed inlet region, which is sealed to prevent fluid communication except between the feed inlet means and the hollow fiber membranes disposed within the feed stage. Such feed inlet region functions as a pressure chamber or vessel. The feed inlet means introduces the feed fluid mixture to be separated into the feed inlet region. Such region communicates with the feed end of the hollow fiber membranes disposed within the feed stage, thus allowing the feed fluid mixture to be separated to flow into and down the bores of the hollow fiber membranes disposed within the feed stage. The feed inlet region may be located within the appropriate end capping means.

The device additionally comprises at least one non-permeate mixing region encompassing the non-permeate end of a stage and the feed end of the immediately successive stage, wherein the non-permeate from said stage enters each non-permeate mixing region from the bores of the hollow fiber membranes disposed within said stage at the non-permeate end of said stage, and each non-permeate mixing region cooperates with the immediately successive non-permeate stage to introduce fluid into the bores of the hollow fiber membranes disposed within said immediately successive non-permeate stage at the feed end of said immediately successive stage. The non-permeate mixing region(s) functions to provide a region for mixing of the non-permeate fluid exiting a stage before said fluid enters the immediately successive stage as feed.

The non-permeate outlet means is adapted for removing fluid which does not permeate through the hollow fiber membranes from the device. The fluid which does not permeate through the hollow fiber membranes exits the bores of the hollow fiber membranes disposed within the final non-permeate stage at the non-permeate end of said final non-permeate stage. The non-permeate outlet means generally is a port, nozzle, fitting, or other opening which allows removal of the non-permeate from the device. The non-permeate outlet means may be located in the appropriate end capping means. In another embodiment wherein a hollow core is used, the core may be adapted to function as the non-permeate outlet means.

Preferably, the device is designed such that there is a region or cavity, that is, the non-permeate outlet region, which is sealed to prevent fluid communication except between the non-permeate outlet means and the hollow fiber membranes disposed within the final non-permeate stage. Such non-permeate outlet region functions as a pressure chamber or vessel. Such region communicates with the non-permeate end of the hollow fiber membranes disposed within the final non-permeate stage, thus allowing the non-permeate fluid to be withdrawn from the device through the non-permeate outlet means. The non-permeate outlet region may be located within the appropriate end capping means.

Thus the membrane device is divided into several distinct regions: the feed inlet region, the region between the tubesheets which is outside of the hollow fiber membranes, at least one non-permeate mixing region, and the non-permeate outlet region. The seals between each region are formed by any means which provides a fluid tight seal between each of the regions. Such seals include means for forming a seal between the non-permeate end of each non-permeate stage and the feed end of each immediately preceding stage. Such seals may be provided by O-rings, gaskets, adhesive materials, and the like.

The hollow fiber membrane bundle is optionally and preferably arranged about a core; the core is arranged such that said core extends through and is bonded to both the first tubesheet and the second tubesheet. The core functions to support the hollow fiber membrane bundle which is arranged about the core. The core may possess a non-circular cross-section. The core preferably possesses a substantially circular cross-section and may comprise a rod, a non-perforated tube, or a perforated tube, provided the core possesses sufficient mechanical strength to support the hollow fiber membranes and the tubesheets. In one preferred embodiment, the core is hollow and is adapted to function as the non-permeate outlet means.

In some embodiments, it is desirable to introduce a sweep fluid into the shellside of the hollow fiber membrane device in order to aid in the removal of permeated fluid from the vicinity of the outside of the hollow fiber membranes. One preferred method of introducing such a sweep fluid is to adapt the core to function as a sweep inlet means for introducing a sweep fluid through the core into the region between the tubesheets on the outside of the hollow fiber membranes. In such an embodiment, the core is perforated in the vicinity of the hollow fiber membrane bundle such that the sweep fluid enters the hollow fiber membrane bundle. The core tube is preferably non-perforated where it passes through the feed inlet region and non-permeate mixing and/or non-permeate outlet region(s). In another preferred embodiment wherein a sweep fluid is used, the core is perforated at one end of the portion of the core located between the tubesheets. In one such preferred embodiment, such end of the core is adjacent to the tubesheet located at the non-permeate end of the final non-permeate stage, which aids in promoting counter-current flow.

The core may be made of any material which possesses sufficient mechanical strength and stiffness to provide the desired support for the bundle and tubesheets. The core may be comprised of a plastic such as PVC, a composite material, or a metal. Preferably, the core is comprised of a metal, for example, aluminum or steel.

The entire membrane device may be placed within an optional casing means. The casing means functions to protect the outside of the membrane device from damage due to handling and/or the outside environment. The casing means also functions as a convenient method of collecting the permeated fluid. The casing means may be arranged about the tubesheets in such a fashion that a seal is formed between the first tubesheet and the casing means and the second tubesheet and the casing means, such that fluid cannot communicate across or through the seal.

The casing means may comprise any material which is capable of protecting the membrane device from damage due to handling and/or the environment. The casing means may, but need not be, a pressure vessel. In those embodiments wherein it is desirable to collect the permeate fluid within the casing means, the casing means should be substantially impermeable to the permeate fluid. Preferably, the casing material is a plastic such PVC, a composite, or a metal. More preferably, the casing material is metal, such as aluminum or steel.

When an optional casing means is employed, the permeate outlet means provides a method for removing the fluid which permeates through the hollow fiber membranes from the region between the two tubesheets which is outside of the hollow fiber membranes. The permeate outlet means may be a port, nozzle, fitting, or other opening adapted for withdrawing the permeate from the shellside of the membrane device. It is preferable that the permeate outlet means be located near the end of the membrane device which results in counter-current flow on the shellside of the device, which enhances the concentration gradient along the hollow fiber membranes, thereby improving the recovery and productivity of the membrane device.

The membrane devices of this invention optionally contain one or more means for channeling flow. Preferably, one means for channeling flow of fluid per stage is used. Such means for channeling flow are arranged to channel flow of permeate from each stage in a direction countercurrent to the flow of fluid down the bores of the hollow fiber membranes disposed within said stage, which is parallel to the longitudinal axis of the bundle, and eventually out of the device. Thus the permeate from all but the final stage becomes a low concentration sweep stream for the shellside of the immediately preceding stage. Such countercurrent flow reduces the concentration of the permeate fluid, thus maximizing the concentration gradient across a major portion of the length of the membrane device.

Preferably, one means for channeling flow encircles the exterior of each stage and has its first end located near, attached to, or embedded in, one of the tubesheets such that the permeate fluid and sweep fluid, if any, cannot exit the stage near said tubesheet; the second end of said exterior means for channeling flow is located a distance from the opposite tubesheet, wherein the distance between the second end of the means for channeling flow and the opposite tubesheet is sufficient to allow the permeate fluid and sweep fluid, if any, to flow into the shellside of the immediately preceding stage, or in the case of the feed stage to flow out of the device, including through the optional permeate outlet means if the optional casing means is employed.

In another embodiment, the means for channeling flow may be embedded in both tubesheets. In such an embodiment, some means of allowing the flow of permeate fluid from the outside of the hollow fiber membrane bundle to flow into the shellside of the immediately preceding stage and to exit the device must be incorporated in the means for channeling flow. Preferably, such means are holes, perforations, or other openings in the means for channeling flow.

The actual distance between the end of the means for channeling flow and the opposite tubesheet is not critical, provided sufficient space is provided between the end of the means for channeling flow and the tubesheet to allow the permeate fluid to enter the shellside of the immediately preceding stage and to be withdrawn from the device, including through the optional permeate outlet means if the optional casing means is employed. This results in an improved recovery and productivity for the device.

The means for channeling flow may, in one preferred embodiment, comprise a series of substantially impermeable baffles or wraps. Such baffles are preferably comprised of relatively flexible materials which are substantially impermeable to the fluids being separated. Preferred baffle materials include relatively flexible and substantially impermeable polymeric films. Examples of suitable baffle materials include MYLAR ® polyester film available from ICI, SARAN ® polyvinylidene chloride plastic film available from The Dow Chemical Company, and polyethylene film.

Such baffles may be arranged as concentric tubes in a direction parallel to the longitudinal axis of the bundle. Optionally, such baffles may be formed in a spiral fashion beginning at the center of the bundle and ending near or at the outside of the bundle. When such spiral baffles are used, means, such as openings therein, for providing flow of permeate and sweep gas, if any, from each stage to the shellside of the immediately preceding stage must be provided.

The number of baffles which may be present is that number which provides sufficient channeling of the permeate fluid to maintain a substantially countercurrent flow. The number of baffles used will therefore depend upon the bundle diameter, the packing factor of the hollow fiber membranes in the bundle, the bundle length, and the number of stages. The baffle length should be sufficient to promote countercurrent flow along a major portion of the length of the hollow fiber membranes. The baffles preferably extend along the length of the bundle between the tubesheets between about 50 and about 95 percent, more preferably between about 75 and about 95 percent, even more preferably between about 80 and about 90 percent.

Optionally, the device may contain a separate tubesheet support means comprising a means which functions to support the outer edge of the tubesheets and to prevent or reduce stresses due to bending and compression as a result of pressurizing the outside faces of the tubesheets. The tubesheet support means is preferably a cylinder which surrounds the outer portion of the bundle and is bonded about the tubesheets with a resin. Any resin which adheres the tubesheets to the tubesheet support means and has sufficient modulus to maintain the bond under normal operating conditions is useful for forming such a bond. Included in the resins which may be used to form such a bond are the resins which may be used to form the tubesheets. The tubesheet support means may surround a portion of the tubesheet and be bonded thereto or the tubesheet support means may be embedded in a tubesheet which is built up around the tubesheet support means. The tubesheet support means may be made of any material which provides sufficient support to prevent or reduce the compression stresses and bending stresses on the tubesheets and to prevent the tubesheets from collapsing in on one another. Such materials include high strength plastics such as PVC, composites, and metals; metals are preferred. Examples of metals which may be used include aluminum or steel. The tubesheet support means contains one or more means such as other ports or openings so as to allow the permeate fluid to exit the device.

Optionally, a material which functions to insulate the membrane device and/or absorb shock may be placed on the outside of the hollow fiber membrane bundle in the region between the two tubesheets, including within the optional casing means. Such a material includes polyurethane foam and tightly packed foam beads. The material generally covers a portion of the outside of the bundle, said portion extending along the length of the bundle between the tubesheets such that a sufficient means such as an opening exists to allow the permeate fluid and sweep fluid, if any, to exit the device, including through the optional permeate outlet means if the optional casing means is employed. In one embodiment, the insulating and/or shock absorbing material also functions as the exterior means for channeling flow.

The hollow fiber membrane devices of this invention may be constructed by adapting the general membrane device fabrication processes well known in the art. Generally, in hollow fiber membrane device construction, the hollow fiber membranes are formed into a bundle with a suitable shape for device construction. Preferred bundle arrangements include parallel laying down of fibers or bias wrap laying down of fibers, preferably arranged about a core. The tubesheets may be formed about the ends of the bundle simultaneously with laying down of the fibers, such as by dripping resin along the fibers as the fibers are laid down. Alternatively, the bundle may be formed and then the tubesheets may be formed about each end of the bundle by centrifugal casting or dunk potting techniques, as well known in the art.

In those embodiments in which it is desirable to build up the tubesheets to a circumference larger than the circumference of the hollow fiber bundle, the following procedure may be used. Where the tubesheets are formed after the formation of the bundle, the casting or potting technique involves using appropriate molds to form larger circumference tubesheets. In the embodiment wherein the tubesheet is formed as the fibers are being laid down, once all the fibers have been laid down, the tubesheets may be built up by a variety of methods. One such method is to continue to wrap resin and impregnated cloth around the end of the tubesheets or circumference of the tubesheets and provide further resin so that the tubesheets are built up; thereafter, the resin is cured.

The optional flow channeling means such as baffles are introduced into the hollow fiber membrane bundle during fabrication of the bundle. If the flow channeling means are placed in spiral or jelly roll configuration, the baffles are placed around the hollow fiber membranes as the hollow fiber membranes are laid down. Alternatively, if the flow channeling means are of a concentric cylinder arrangement, then after a portion of the hollow fiber membranes are laid down, a flow channeling means is placed over the hollow fiber membranes, and further fiber layers are laid down until the next flow channeling means is placed over the hollow fiber membranes; this procedure is continued until the device is completed. An exterior flow channeling means is preferably placed over the completely wrapped bundle.

Once the hollow fiber bundle with optional core, tubesheets, and optional means for channeling flow has been assembled, then the optional tubesheet support means is placed about the outside of the bundle and affixed or attached to the tubesheets. For example, the optional tubesheet support may be bound to the tubesheets using a resin or the tubesheets are built up around the ends of the tubesheet support means. In one embodiment wherein the tubesheet support means is bonded to the tubesheets, the following procedure is used. With the tubesheet support means on end, the tubesheets and bundle are inserted into the tubesheet support means, caulking is packed into the space between the tubesheet support means and one of the tubesheets at a depth of up to several inches. A fast setting resin is used to wet the caulking, forming a sealed annular groove. Thereafter, bonding resin is poured into the groove bonding the tubesheet to the groove. After the resin is cured, the device is rotated end for end and the other tubesheet is bonded in the same fashion. The tubesheets may also be potted and placed inside of the tubesheet support means, forming the tubesheet and the bond between the tubesheets and the tubesheet support means in a single step. Other methods of attachment may be used.

Once the optional tubesheet support means is attached to the tubesheets, then an attachment means may be affixed to the optional tubesheet support means, the tubesheets, or both, which is adapted for attaching the end capping means thereto. In one embodiment, a flange is welded to the optional tubesheet support means or bonded to the tubesheets via a resin, or both. Thereafter, the end capping means are attached to such a flange. Where necessary, gaskets are placed between the flange about the tubesheets and the end capping means so as to insure a fluid tight seal. Alternatively, slip flanges may be used as described hereinbefore to attach the end capping means. The end capping means may contain a lip or taper, against which a gasket or O-ring is optionally placed, and against which the outer circumference of the tubesheet face adjacent to the gasket or O-ring seals under the influence of the hydrostatic pressure applied during operation of the device.

Alternatively, if an optional casing means is used, at least one of the end capping means is attached after the hollow fiber membrane bundle with optional core, tubesheets, and optional tubesheet support means are inserted into the optional casing means. Note that prior to insertion into the optional casing means, the faces of the tubesheets exterior to the bundle are machined or otherwise treated so as to open the ends of the hollow fiber membranes so as to allow introduction of fluid into and withdrawal of fluid from such hollow fiber membranes.

The following descriptions of preferred embodiments as illustrated by the Figures are provided to further illustrate the invention.

FIG. 1 demonstrates a hollow fiber membrane device of the present invention which comprises two concentric stages. The device comprises a bundle of hollow fibers (10) (the hollow fibers are not shown for simplicity). Interspersed within such bundle (10) is a series of baffles (11), which comprise a series of hollow impermeable cylinders arranged in a fashion parallel to the longitudinal axis of the bundle (10) and the optional core (12). The device optionally contains a tubesheet support means (13) which is embedded in the tubesheets (14 and 15). The optional core (12) extends through the first tubesheet (14) and the second tubesheet (15) and is bonded thereto. Further, the bundle (10) is arranged about and supported by said optional core (12). Encircling the entire bundle (10) and tubesheets (14 and 15) is an optional casing means (16). At each end of the casing means (16) are end capping means (17 and 18) which are sealed by O-rings (19 and 20) to the exterior of the tubesheets (14 and 15). In one end capping means (18) is found a feed inlet means (21), which is adapted for introducing into the device a mixture of fluids to be separated and a non-permeate outlet means (22), which is adapted for withdrawing the fluid which does not permeate across the hollow fiber membranes from the device. In the optional casing means (16) is located a permeate outlet means (23), which is adapted for withdrawing the permeate fluid from the device. Further illustrated are end capping attachment means (24), which are adapted for securing the end capping means (17 and 18) to the device. The optional tubesheet support means (13) further contains ports or holes (25) in the end near the permeate outlet means (23), such ports or holes being designed to allow the flow of permeate fluid through the optional tubesheet support means (13) to the permeate outlet means (23). The device further comprises a feed inlet region (26), which is the region adapted for introducing the feed fluid mixture to be separated into the bores of the hollow fiber membranes disposed within the feed stage (27) of the bundle (10). A non-permeate mixing region (28) receives non-permeate fluid exiting from the bores of the hollow fiber membranes disposed within the feed stage (27) and introduces said fluid into the bores of the hollow fiber membranes disposed within the non-permeate stage (29). A non-permeate outlet region (30) receives the fluid exiting from the bores of the hollow fiber membranes disposed within the non-permeate stage (29) which does not permeate the hollow fiber membranes. The non-permeate is withdrawn from the non-permeate outlet region (30) through the non-permeate outlet means (22). An O-ring (39) in the end capping means (18) provides a sealing means between the feed inlet region (26) and the non-permeate outlet region (30).

Another embodiment of the present invention is illustrated by FIG. 2. In this embodiment, a two stage concentric device contains a hollow core which is adapted to function as the non-permeate outlet means. The device comprises a bundle of hollow fibers (10) (the hollow fibers are not shown for simplicity). Interspersed within such bundle (10) is a series of baffles (11), which comprise a series of hollow impermeable cylinders arranged in a fashion parallel to the longitudinal axis of the bundle (10) and hollow core (12). The device optionally contains a tubesheet support means (13) which is embedded in the tubesheets (14 and 15). The hollow core (12) extends through the first tubesheet (14) and the second tubesheet (15) and is bonded thereto. Further, the bundle (10) is arranged about and supported by said hollow core (12). Encircling the entire bundle (10) and tubesheets (14 and 15) is an optional casing means (16). At each end of the casing means (16) are end capping means (17 and 18). The casing means (16) is sealed by O-rings (19 and 20) to the tubesheets (14 and 15). In one end capping means (17) is found a feed inlet means (21), which is adapted for introducing into the device a mixture of fluids to be separated. The other end capping means (18) contains a port (31), which is adapted to cooperate with the hollow core (12) to serve as the non-permeate outlet means to withdraw fluid which does not permeate across the hollow fiber membranes from the device. In the casing means (16) is located a permeate outlet means (23), which is adapted for withdrawing the permeate fluid from the device. Further illustrated are end capping attachment means (24), which are adapted for securing the end capping means (17 and 18) to the device. The optional tubesheet support means (13) further contains ports or holes (25) in the end near the permeate outlet means (23), such ports or holes being designed to allow the flow of permeate fluid through the optional tubesheet support means (13) to the permeate outlet means (23). The device further comprises a feed inlet region (26), which is the region adapted for introducing the feed fluid mixture to be separated into the bores of the hollow fiber membranes disposed within the feed stage (27) of the bundle (10). A non-permeate mixing region (28) receives non-permeate fluid exiting from the bores of the hollow fiber membranes disposed within the feed stage (27) and introduces said fluid into the bores of the hollow fiber membranes disposed within the non-permeate stage (29). A non-permeate outlet region (30), formed by the product end capping means (40), receives the fluid exiting from the bores of the hollow fiber membranes disposed within the non-permeate stage (29) which does not permeate the hollow fiber membranes. The product end capping means separates the feed inlet region (26) from the non-permeate outlet region (30), using sealing means (39). The non-permeate is withdrawn from the non-permeate outlet region (30) through the non-permeate outlet means (22) comprising the hollow core (12) and the port (31).

Another embodiment of the invention is illustrated by FIG. 3. This embodiment illustrates a two-stage concentric device which is adapted for the use of a sweep fluid. The device comprises a hollow fiber membrane bundle (10) (the hollow fibers are not shown for simplicity), which is arranged about a hollow core (12). The hollow core (12) extends through and is bonded to a first tubesheet (14) and a second tubesheet (15) at either end of the hollow fiber membrane bundle (10). The hollow core (12) has a sweep fluid inlet port (32) adapted for introducing a sweep fluid into the bundle (10) via perforations in the hollow core (33). The hollow core (12) is plugged by a plug (34) at its other end, thereby forcing all the sweep fluid into the region between the two tubesheets (14 and 15) which is outside the hollow fiber membranes in the bundle (10). The device further comprises a series of baffles (11), which comprise a series of hollow impermeable cylinders arranged in a fashion parallel to the longitudinal axis of the bundle (10) and hollow core (12). The bundle (10) is surrounded by an external baffle (35). The exterior baffle (35) is embedded in the tubesheets (14 and 15) at both ends. Located in one end of the external baffle (35) is a series of holes (36) adapted for allowing the permeate fluid and sweep fluid to flow to the permeate outlet means (23) out of the device. The bundle is encased in a casing means (16) which is sealed to the tubesheets by O-rings (19 and 20). End capping means (17 and 18) are located at the ends of the device near the tubesheets (14 and 15). In one end capping means (17) is a feed inlet means (21) adapted for introducing a mixture of fluids to be separated to the device and into a feed inlet region (26). In the same end capping means (17) is a non-permeate outlet means (22). The non-permeate outlet means (22) communicates with the non-permeate outlet region (30). The other end capping means (18) contains the sweep fluid inlet means (32) and the non-permeate mixing region (28) which receives the fluid which does not permeate in the feed stage (27) and introduces said fluid into the non-permeate stage (29). The end capping means (17 and 18) are attached to the casing means (16) via attachment means (24) and seals (37 and 38). An O-ring (39) in the end capping means (17) provides a sealing means between the feed inlet region (26) and the non-permeate outlet region (30).

In many of these separations, the force which drives the selectively permeating fluids across and through the membrane is a pressure or chemical differential between the feed side of the hollow fiber membranes and the permeate side of the hollow fiber membranes. Feed side of the membrane refers herein to that side of the membrane to which the feed fluid mixture is contacted. Permeate side of the membrane is that side of the membrane to which the fluids selectively permeate and on which the stream richer in the preferentially permeating fluids can be found. In a device adapted for boreside feed, the permeate side of the membrane is the shellside, that is, the region between the two tubesheets which is on the outside of the hollow fiber membranes.

The device is operated at pressures and temperatures which do not deleteriously affect the physical integrity of the device on the membranes contained therein.

Preferably, in the separation of oxygen from nitrogen, the pressure differential is between about 90 psi (620 kPa) and about 250 psi (1720 kPa). In the embodiment wherein nitrogen or carbon dioxide is separated from light hydrocarbons or natural gas, the pressure differential across the membrane is preferably between about 280 psi (1930 kPa) and about 900 psi (6200 kPa). In the embodiment wherein oxygen is separated from nitrogen, the separation preferably takes place at temperatures of between about 0° C. and about 100° C., more preferably between about 0° C. and about 50° C. In the embodiment wherein nitrogen or carbon dioxide is separated from light hydrocarbons or natural gas, the separation preferably takes place at temperatures between about −10° C. and about 120° C.

In membrane stripping, membrane distillation, and pervaporation operations, the temperatures are preferably between about 10° C. and about 95° C. and the pressure gradient across the membrane is preferably between about zero psi and about 60 psi.

Operation of the membrane device can be illustrated by reference to FIG. 1. A mixture of fluids to be separated is introduced via the feed inlet means (21) into the feed inlet region (26) under pressure The fluids to be separated thus flow down the bores of the hollow fiber membranes disposed within the feed stage (27). A portion of the feed fluid mixture permeates across the membranes into the shellside of the membrane device. The baffles (11) force the permeate fluid to flow in a countercurrent direction. The fluid which does not permeate exits the hollow fiber membranes disposed within the feed stage (27) and enters the non-permeate mixing region (28), from which the fluid is introduced into the bores of the hollow fiber membranes disposed within the non-permeate stage (29). The fluid which permeates across the hollow fiber membranes into the shellside of the membrane device is forced by the baffles (11) to flow countercurrently. The fluid which does not permeate exits the hollow fiber membranes disposed within the non-permeate stage (29), enters into the non-permeate outlet region (30), and is removed from the device through the non-permeate outlet means (22). The permeate is removed from the shellside of the device through the permeate outlet means (23).

The devices of this invention may be constructed so that the feed fluid mixture is introduced into the innermost concentric stage, rather than into the outermost concentric stage as illustrated in FIG. 1. In such an embodiment, a perforated core may be utilized as the permeate outlet means and an external flow channeling means may be utilized to provide a seal extending from tubesheet to tubesheet around the outside of the bundle to prevent permeate fluid from exiting the outside of the bundle except through the perforated core. Such an arrangement in conjunction with optional means for channeling flow preserves countercurrent flow within the device.

The devices of this invention may optionally be utilized in conventional series or parallel operations.

SPECIFIC EMBODIMENTS

The following Example is included for purposes of illustration only and is not intended to limit the scope of the invention or claims.

EXAMPLE

A device similar to the device illustrated in FIG. 3 was constructed, except that the core was non-perforated and the device was adapted to enable operation as a single stage device or a two-stage device. The device was constructed using tetrabromobisphenol A polycarbonate hollow fiber membranes, epoxy tubesheets, and MYLAR® polyester film baffles. The device contained a surface area for the outer stage of about 220 square meters and a surface area for the inner stage of about 110 square meters.

The device was tested for the separation of an air feed stream into an enriched nitrogen non-permeate stream and an enriched oxygen permeate stream. The device was tested by operating the outer stage and the inner stage in series, that is, as a two stage device in accordance with the present invention, using the outer stage as the feed stage and the inner stage as the non-permeate stage. The device was also tested by operating the outer stage and the inner stage each as single pass stages, that is, the equivalent of two conventional single stage devices operated in parallel. The performance at a given concentration of the faster permeating species, that is, at a concentration of about 1 percent oxygen, in the non-permeate was evaluated and the recovery determined. Recovery, a measure of separation performance efficiency, is the ratio of the flow rate of the non-permeate stream over the flow rate of the feed stream, typically expressed as a percentage. Recovery is thus calculated from the following equation:

$$\text{Percent Recovery} = \frac{\text{(flow rate of non-permeate)}}{\text{(flow rate of feed)}} \times 100,$$

wherein the recovery is determined at a given concentration of the faster permeating species in the non-permeate.

The tests were conducted using a feed air temperature of about 25° C., a total feed air flow rate of about 23.2 SCFM (standard cubic feet per minute) and a feed air pressure of about 135 psig. For the test in which the device was operated as a single stage device, the feed air flow rate into the outer stage and the inner stage was controlled relative to the surface area contained in each stage.

When operated in accordance with the present invention as a two-stage device, the device exhibited a recovery of about 35.2 percent. When operated as a conventional single pass device, the outer stage exhibited a recovery of about 30.1 percent and the inner stage exhibited a recovery of about 33.6 percent. Therefore, operating the device as a two-stage device significantly enhanced recovery.

What is claimed is:

1. A concentric multistage hollow fiber membrane fluid separation device adapted for boreside feed comprising:

A. a bundle comprising a plurality of hollow fiber membranes adapted for the separation of one or more fluids from one or more other fluids in a feed fluid mixture, wherein the bundle is partitioned into multiple stages comprising concentric annular regions comprising a feed stage and at least one non-permeate stage, wherein each stage possesses a feed end and a non-permeate end, wherein the feed end of each non-permeate stage is located at the opposite end of the bundle from the feed end of the immediately preceding stage and the non-permeate end of each non-permeate stage is located at the opposite end of the bundle from the non-permeate end of the immediately preceding stage;

B. a first tubesheet comprising a thermoset or thermoplastic polymeric material located adjacent to the first end of the bundle, wherein the first tubesheet is arranged such that the hollow fiber membranes are embedded in the first tubesheet and communicate through the first tubesheet and are open on the exterior face of the first tubesheet;

C. a second tubesheet comprising a thermoset or thermoplastic polymeric material located adjacent to the second end of the bundle opposite the first end of the bundle, wherein the second tubesheet is arranged such that the hollow fiber membranes are embedded in the second tubesheet and communicate through the second tubesheet and are open on the exterior face of the second tubesheet;

D. a first end capping means arranged and adapted for sealing at the vicinity of the first end of the bundle and/or the first tubesheet;

E. a first attachment means arranged for attaching the first end capping means at the vicinity of the first end of the bundle and/or the first tubesheet;

F. a first means for forming a seal between the first end capping means and the first end of the bundle and/or the first tubesheet;

G. a second end capping means arranged and adapted for sealing at the vicinity of the second end of the bundle and/or the second tubesheet;

H. a second attachment means arranged for attaching the second end capping means at the vicinity of the second end of the bundle and/or the second tubesheet;

I. a second means for forming a seal between the second end capping means and the second end of the bundle and/or the second tubesheet;

J. a feed inlet means adapted for introducing the feed fluid mixture to be separated into the device;

K. a feed inlet region, wherein the feed inlet region is sealed such that fluid enters the feed inlet region through the feed inlet means or leaves the feed inlet region through the hollow fiber membranes disposed within the feed stage, wherein the feed inlet region is arranged to introduce the feed fluid mixture into the bores of the hollow fiber membranes disposed within the feed stage at the feed end of said feed stage;

L. at least one non-permeate mixing region encompassing the non-permeate end of a stage and the feed end of the immediately successive stage, wherein the non-permeate from said stage enters each non-permeate mixing region from the bores of the hollow fiber membranes disposed within said stage at the non-permeate end of said stage, and each non-permeate mixing region cooperates with the immediately successive non-permeate stage to introduce fluid into the bores of the hollow fiber membranes disposed within said immediately successive non-permeate stage at the feed end of said immediately successive stage;

M. a non-permeate outlet means adapted for removing fluid which does not permeate through the hollow fiber membranes from the device;

N. a non-permeate outlet region, wherein the non-permeate outlet region is sealed such that fluid which does not permeate the hollow fiber membranes enters the non-permeate outlet region through the hollow fiber membranes or leaves the non-permeate outlet region through the non-permeate outlet means, wherein the non-permeate outlet region is arranged to remove the fluid which does not permeate the hollow fiber membranes from the device through the non-permeate outlet means; and O. means for forming a seal between the non-permeate end of each non-permeate stage and the feed end of each immediately preceding stage.

2. The device of claim 1 which further comprises:

P. at least one means for channeling flow per stage of fluid which permeates through the hollow fiber membranes to the region between the two tubesheets which is outside of the hollow fiber membranes, wherein each means for channeling flow is arranged to channel flow of fluid which permeates through the hollow fiber membranes from each stage in a direction countercurrent to the flow of fluid down the bores of the hollow fiber membranes disposed within said stage, which is parallel to the longitudinal axis of the bundle, wherein each means for channeling flow has one end located near, embedded in, or attached to one of the tubesheets and the second end located at a distance from the opposite tubesheet, wherein the distance between the second end of the means for channeling flow and the opposite tubesheet is sufficient to allow the fluid which permeates through the hollow fiber membranes and flows along the means for channeling flow to flow therethrough.

3. The device of claim 2 which further comprises:
Q. a core about which is arranged the bundle, further arranged such that the core extends through and is bonded to the first tubesheet and the second tubesheet.

4. The device of claim 3 which further comprises:
R. a casing means surrounding the bundle, the first tubesheet, the second tubesheet, and the core; and
S. a permeate outlet means for removing fluid which permeates through the hollow fiber membranes from the region between the two tubesheets which is outside of the hollow fiber membranes.

5. The device of claim 4 which further comprises:
T. a means for introducing a sweep fluid into the region between the two tubesheets which is outside of the hollow fiber membranes.

6. The device of claim 5 wherein the core is adapted to function as the means for introducing a sweep fluid into the region between the two tubesheets which is outside of the hollow fiber membranes.

7. The device of claim 4 wherein the hollow fiber membranes have a dense discriminating region which separates one or more fluids from one or more other fluids.

8. The device of claim 7 wherein the feed fluid mixture to be separated comprises a mixture of two or more gases.

9. The device of claim 8 wherein the feed fluid mixture to be separated comprises one or more gases selected from the group consisting of hydrogen, helium, oxygen, nitrogen, carbon monoxide, carbon dioxide, hydrogen sulfide, ammonia, and light hydrocarbons.

10. The device of claim 9 wherein the feed gas mixture to be separated comprises oxygen and nitrogen.

11. The device of claim 9 wherein the feed gas mixture to be separated comprises hydrogen or helium and at least one light hydrocarbon.

12. The device of claim 8 wherein the hollow fiber membranes comprise at least one polymeric material selected from the group consisting of polysulfones, polyethersulfones, polyimides, polyestercarbonates, and polycarbonates.

13. The device of claim 12 wherein the hollow fiber membranes comprise at least one polymeric material selected from the group consisting of polyestercarbonates and polycarbonates.

14. The device of claim 4 wherein the feed fluid mixture to be separated comprises a mixture of two or more liquids.

15. The device of claim 14 wherein the fluid permeates through or across the membrane as a gas or vapor which is removed from the device as a gas or vapor.

16. The device of claim 15 wherein the membranes are microporous.

17. The device of claim 16 wherein the membranes are comprised of at least one polymeric material selected from the group consisting of polyolefins, fluorinated polyolefins, polystyrenes, polyetherketones, and polyetheretherketones.

18. The device of claim 17 wherein the membranes are comprised of at least one polyolefin selected from the group consisting of polyethylene, polypropylene, and poly-4-methylpentene.

19. The device of claim 16 wherein the feed liquid mixture to be separated comprises one or more liquids selected from the group consisting of $C_{1-10}$ aliphatic and aromatic halogenated hydrocarbons, $C_{1-10}$ aliphatic and aromatic hydrocarbons, $C_{1-10}$ aliphatic and aromatic alcohols, $C_{1-8}$ ethers, and $C_{1-8}$ amines.

20. The device of claim 4 wherein the means for channeling flow comprise impermeable baffles which extend about 50 percent to about 95 percent of the bundle length between the two tubesheets.

21. The device of claim 4 wherein the hollow fiber membrane bundle is bias wrapped.

22. The device of claim 4 wherein the hollow fiber membrane bundle is parallel wrapped.

23. The device of claim 4 wherein the casing means comprises a pressure vessel.

24. The device of claim 4 wherein the bundle is partitioned into multiple stages comprising a feed stage and one non-permeate stage.

25. The device of claim 4 wherein the core is adapted to function as the non-permeate outlet means.

26. The device of claim 4 wherein the casing means is substantially impermeable to the permeate fluid.

* * * * *